US012163802B2

(12) United States Patent
Konishi

(10) Patent No.: US 12,163,802 B2
(45) Date of Patent: Dec. 10, 2024

(54) MAP GENERATION APPARATUS AND POSITION RECOGNITION APPARATUS

(71) Applicant: Honda Motor Co., Ltd., Tokyo (JP)

(72) Inventor: Yuichi Konishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 312 days.

(21) Appl. No.: 17/676,740

(22) Filed: Feb. 21, 2022

(65) Prior Publication Data

US 2022/0291013 A1 Sep. 15, 2022

(30) Foreign Application Priority Data

Mar. 9, 2021 (JP) .................................. 2021-037058

(51) Int. Cl.
*G01C 21/00* (2006.01)

(52) U.S. Cl.
CPC ....... *G01C 21/387* (2020.08); *G01C 21/3822* (2020.08); *G01C 21/3896* (2020.08)

(58) Field of Classification Search
CPC .............. G01C 21/387; G01C 21/3896; G01C 21/3822
USPC ....................................................... 701/532
See application file for complete search history.

(56) References Cited

U.S. PATENT DOCUMENTS

| 2021/0183099 | A1* | 6/2021 | Fujii | ........................ G06T 7/248 |
| 2021/0333108 | A1* | 10/2021 | Li | ........................ G01C 21/005 |
| 2022/0198198 | A1* | 6/2022 | Marcotte | ............ G01C 21/3822 |

FOREIGN PATENT DOCUMENTS

| CN | 109887087 A | 6/2019 |
| CN | 112348029 A | 2/2021 |
| EP | 3886053 A1 | 9/2021 |
| JP | 2019174910 A | 10/2019 |

OTHER PUBLICATIONS

Chinese Office action; Application 202210178469.9; Jun. 1, 2023.

* cited by examiner

*Primary Examiner* — Hunter B Lonsberry
*Assistant Examiner* — Helen Li
(74) *Attorney, Agent, or Firm* — Duft & Bornsen, PC

(57) ABSTRACT

A map generation apparatus includes: an in-vehicle detection unit configured to detect a situation around a subject vehicle in traveling; and a microprocessor. The microprocessor is configured to perform: extracting one or more feature points from detection data acquired by the in-vehicle detection unit; generating a map using the extracted feature points; dividing an area on the map generated in the generating in a traveling direction of a subject vehicle and dividing the area in the vehicle width direction based on a division line information regarding a division line of a road to form a plurality of divided areas; and correcting a number of feature points for each of the divided areas formed in the dividing. The microprocessor is configured to perform the correcting including reducing the number of feature points based on a distribution of feature points included in each of the divided areas.

6 Claims, 7 Drawing Sheets

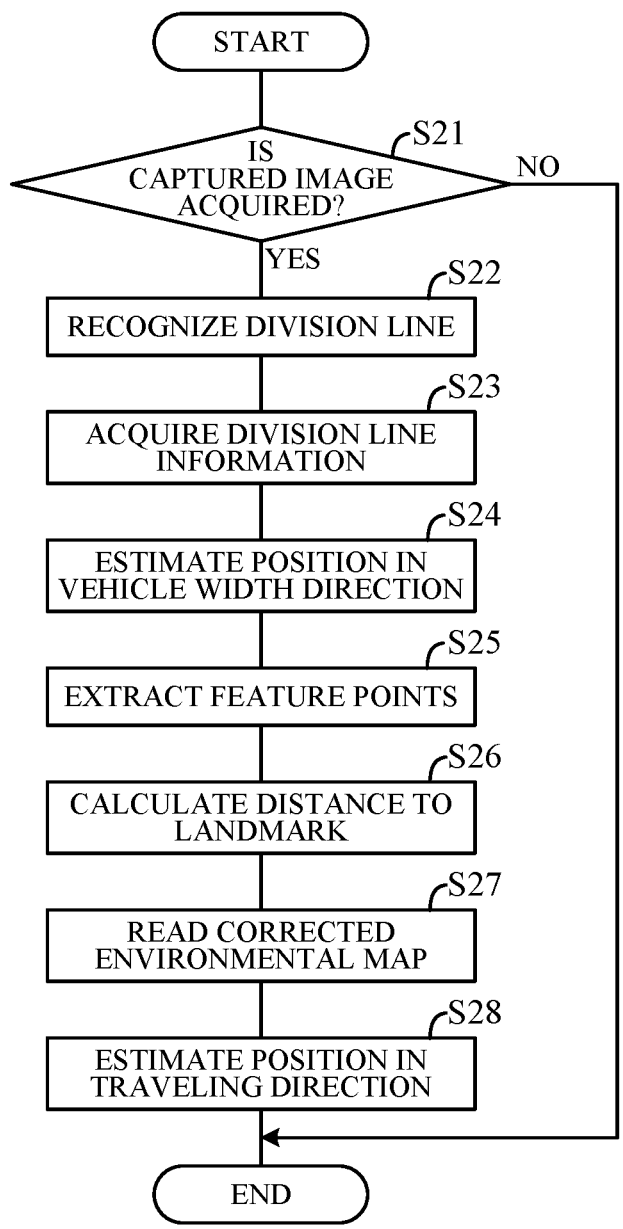

MAP GENERATION APPARATUS AND POSITION RECOGNITION APPARATUS

CROSS-REFERENCE TO RELATED APPLICATION

This application is based upon and claims the benefit of priority from Japanese Patent Application No. 2021-037058 filed on Mar. 9, 2021, the content of which are incorporated herein by reference.

BACKGROUND OF THE INVENTION

Field of the Invention

This invention relates to a map generation apparatus configured to generate a map used for estimating a position of a vehicle and a position recognition apparatus configured to recognize the position of the vehicle on the map.

Description of the Related Art

As this type of device, there has been conventionally known a device configured to create a map using feature points extracted from a captured image acquired by a camera mounted on a traveling vehicle (see, for example, JP 2019-174910 A).

Incidentally, depending on the number of objects and the background included in the angle of view of an in-vehicle camera, the number of feature points extracted from the captured image increases, and the data size of the map increases accordingly. Therefore, if a map is created simply using feature points extracted from a captured image as in the device described in JP 2019-174910 A described above, the capacity of the memory device can be greatly reduced.

SUMMARY OF THE INVENTION

An aspect of the present invention is a map generation apparatus including: an in-vehicle detection unit configured to detect a situation around a subject vehicle in traveling; and a microprocessor and a memory connected to the microprocessor. The microprocessor is configured to perform: extracting one or more feature points from detection data acquired by the in-vehicle detection unit; generating a map using the feature points extracted in the extracting; dividing an area on the map generated in the generating in a traveling direction of the subject vehicle and dividing the area in a vehicle width direction based on a division line information regarding a division line of a road to form a plurality of divided areas; and correcting a number of feature points for each of the divided areas formed in the dividing. The microprocessor is configured to perform the correcting including reducing the number of feature points based on a distribution of feature points included in each of the divided areas.

BRIEF DESCRIPTION OF THE DRAWINGS

The objects, features, and advantages of the present invention will become clearer from the following description of embodiments in relation to the attached drawings, in which:

FIG. 6 is a flowchart illustrating another example of processing executed by the controller in FIG. 2.

DETAILED DESCRIPTION OF THE INVENTION

An embodiment of the present invention will be described below with reference to FIGS. 1 to 6. A position recognition apparatus according to the embodiment of the present invention can be applied to a vehicle having a self-driving capability, that is, a self-driving vehicle. Note that a vehicle to which the position recognition apparatus according to the present embodiment is applied may be referred to as a subject vehicle to be distinguished from other vehicles. The subject vehicle may be any of an engine vehicle including an internal combustion (engine) as a traveling drive source, an electric vehicle including a traveling motor as a traveling drive source, and a hybrid vehicle including an engine and a traveling motor as a traveling drive source. The subject vehicle can travel not only in a self-drive mode in which a driving operation by a driver is unnecessary, but also in a manual drive mode by the driving operation by the driver.

Figure 1:
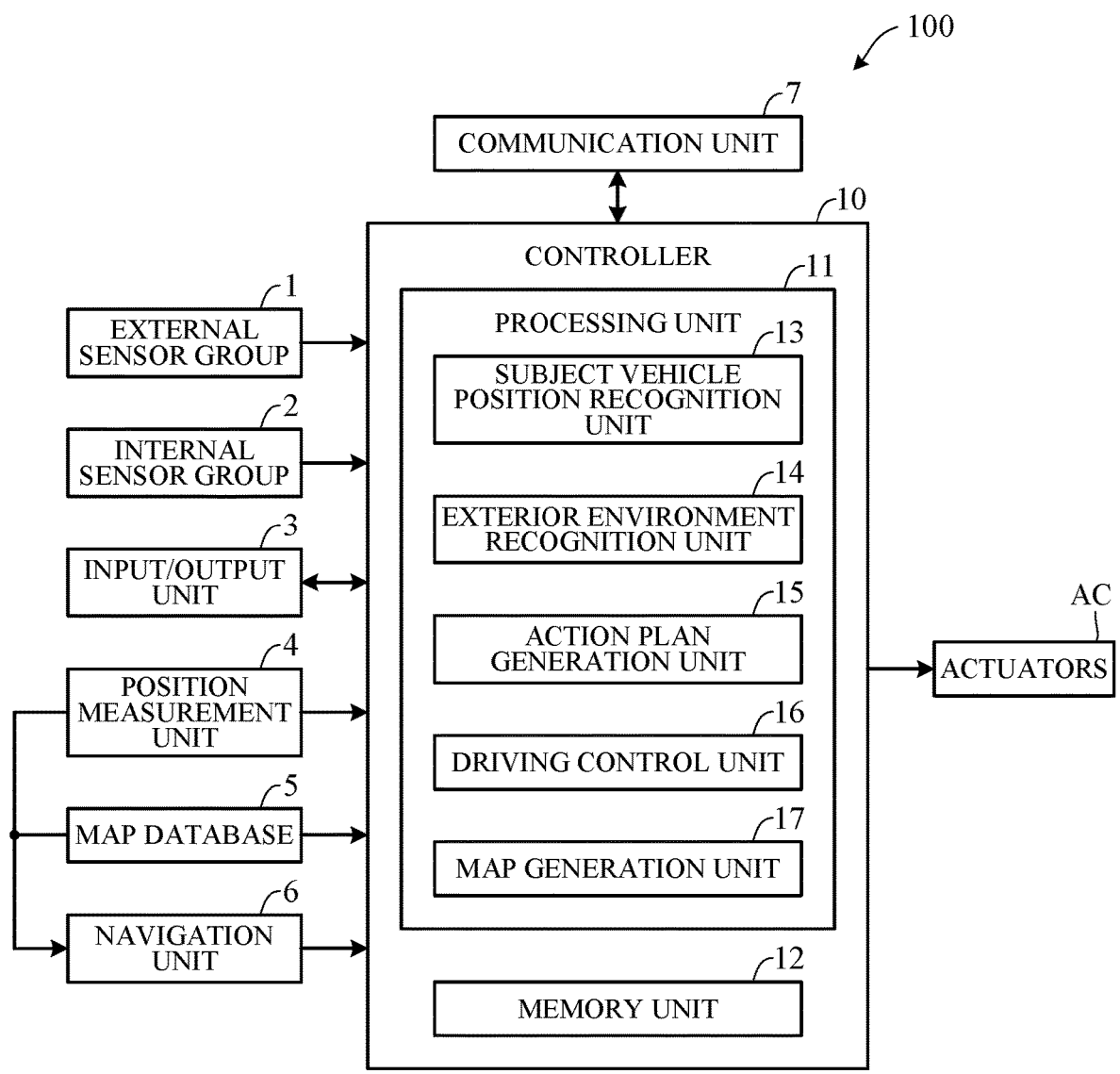
FIG. 1 is a block diagram schematically illustrating an overall configuration of a vehicle control system according to an embodiment of the present invention.

First, a schematic configuration related to self-driving will be described. FIG. 1 is a block diagram schematically illustrating an overall configuration of a vehicle control system 100 including a position recognition apparatus according to the embodiment of the present invention. As illustrated in FIG. 1, the vehicle control system 100 mainly includes a controller 10, an external sensor group 1, an internal sensor group 2, an input/output device 3, a position measurement unit 4, a map database 5, a navigation unit 6, a communication unit 7, and a traveling actuator AC each communicably connected to the controller 10.

The external sensor group 1 is a generic term for a plurality of sensors (external sensors) that detects an external situation which is peripheral information of the subject vehicle. For example, the external sensor group 1 includes a LiDAR that measures scattered light with respect to irradiation light in all directions of the subject vehicle and measures a distance from the subject vehicle to surrounding obstacles, a radar that detects other vehicles, obstacles, and the like around the subject vehicle by emitting electromagnetic waves and detecting reflected waves, a camera that is mounted on the subject vehicle, has an imaging element such as a charge coupled device (CCD) or a complementary metal oxide semiconductor (CMOS), and images a periphery (forward, backward, and sideward) of the subject vehicle, and the like.

The internal sensor group 2 is a generic term for a plurality of sensors (internal sensors) that detects a traveling state of the subject vehicle. For example, the internal sensor group 2 includes a vehicle speed sensor that detects a vehicle speed of the subject vehicle, an acceleration sensor that detects an acceleration in a front-rear direction of the subject vehicle and an acceleration in a left-right direction (lateral acceleration) of the subject vehicle, a revolution sensor that detects the number of revolution of the traveling drive source, a yaw rate sensor that detects a rotation angular speed around a vertical axis of the centroid of the subject vehicle, and the like. The internal sensor group 2 further includes a sensor that detects driver's driving operation in a manual drive mode, for example, operation of an accelerator pedal, operation of a brake pedal, operation of a steering wheel, and the like.

The input/output device 3 is a generic term for devices in which a command is input from a driver or information is output to the driver. For example, the input/output device 3 includes various switches to which the driver inputs various commands by operating an operation member, a microphone to which the driver inputs a command by voice, a display that provides information to the driver via a display image, a speaker that provides information to the driver by voice, and the like.

The position measurement unit (global navigation satellite system (GNSS) unit) 4 includes a position measurement sensor that receives a signal for position measurement transmitted from a position measurement satellite. The position measurement satellite is an artificial satellite such as a global positioning system (GPS) satellite or a quasi-zenith satellite. The position measurement unit 4 uses the position measurement information received by the position measurement sensor to measure a current position (latitude, longitude, and altitude) of the subject vehicle.

The map database 5 is a device that stores general map information used for the navigation unit 6, and is constituted of, for example, a hard disk or a semiconductor element. The map information includes road position information, information on a road shape (curvature or the like), and position information on intersections and branch points. Note that the map information stored in the map database 5 is different from highly accurate map information stored in a memory unit 12 of the controller 10.

The navigation unit 6 is a device that searches for a target route on a road to a destination input by a driver and provides guidance along the target route. The input of the destination and the guidance along the target route are performed via the input/output device 3. The target route is calculated on the basis of a current position of the subject vehicle measured by the position measurement unit 4 and the map information stored in the map database 5. The current position of the subject vehicle can be also measured using the detection value of the external sensor group 1, and the target route may be calculated on the basis of the current position and the highly accurate map information stored in the memory unit 12.

The communication unit 7 communicates with various servers not illustrated via a network including wireless communication networks represented by the Internet, a mobile telephone network, and the like, and acquires the map information, traveling history information, traffic information, and the like from the server periodically or at an arbitrary timing. The network includes not only a public wireless communication network but also a closed communication network provided for each predetermined management region, for example, a wireless LAN, Wi-Fi (registered trademark), Bluetooth (registered trademark), and the like. The acquired map information is output to the map database 5 and the memory unit 12, and the map information is updated.

The actuator AC is a traveling actuator for controlling traveling of the subject vehicle. In a case where the traveling drive source is an engine, the actuator AC includes a throttle actuator that adjusts an opening (throttle opening) of a throttle valve of the engine. In the case where the traveling drive source is a traveling motor, the traveling motor is included in the actuator AC. The actuator AC also includes a brake actuator that operates a braking device of the subject vehicle and a steering actuator that drives a steering device.

The controller 10 includes an electronic control unit (ECU). More specifically, the controller 10 includes a computer that has a processing unit 11 such as a central processing unit (CPU) (microprocessor), the memory unit 12 such as a read only memory (ROM) and a random access memory (RAM), and other peripheral circuits (not illustrated) such as an input/output (I/O) interface. Note that although a plurality of ECUs having different functions such as an engine control ECU, a traveling motor control ECU, and a braking device ECU can be separately provided, in FIG. 1, the controller 10 is illustrated as a set of these ECUs for convenience.

The memory unit 12 stores highly accurate detailed map information (referred to as highly accurate map information). The highly accurate map information includes road position information, information of a road shape (curvature or the like), information of a road gradient, position information of an intersection or a branch point, information of the number of lanes, width of a lane and position information for each lane (information of a center position of a lane or a boundary line of a lane position), position information of a landmark (traffic lights, signs, buildings, etc.) as a mark on a map, and information of a road surface profile such as unevenness of a road surface. The highly accurate map information stored in the memory unit 12 includes map information acquired from the outside of the subject vehicle via the communication unit 7, for example, information of a map (referred to as a cloud map) acquired via a cloud server, and information of a map created by the subject vehicle itself using detection values by the external sensor group 1, for example, a map (referred to as an environmental map) including point cloud data generated by mapping using a technology such as simultaneous localization and mapping (SLAM). The memory unit 12 also stores information on information such as various control programs and threshold values used in the programs.

The processing unit 11 includes a subject vehicle position recognition unit 13, an exterior environment recognition unit 14, an action plan generation unit 15, a driving control unit 16, and a map generation unit 17 as functional configurations.

The subject vehicle position recognition unit 13 recognizes the position (subject vehicle position) of the subject vehicle on a map, on the basis of the position information of the subject vehicle, obtained by the position measurement unit 4, and the map information of the map database 5. The subject vehicle position may be recognized using the map information stored in the memory unit 12 and the peripheral information of the subject vehicle detected by the external sensor group 1, whereby the subject vehicle position can be recognized with high accuracy. Note that when the subject vehicle position can be measured by a sensor installed on the road or outside a road side, the subject vehicle position can be recognized by communicating with the sensor via the communication unit 7.

The exterior environment recognition unit 14 recognizes an external situation around the subject vehicle on the basis of the signal from the external sensor group 1 such as a LiDAR, a radar, and a camera. For example, the position, speed, and acceleration of a surrounding vehicle (a forward vehicle or a rearward vehicle) traveling around the subject vehicle, the position of a surrounding vehicle stopped or parked around the subject vehicle, the positions and states of other objects and the like are recognized. Other objects include signs, traffic lights, markings such as division lines and stop lines of roads, buildings, guardrails, utility poles, signboards, pedestrians, bicycles, and the like. The states of other objects include a color of a traffic light (red, blue, yellow), the moving speed and direction of a pedestrian or a bicycle, and the like. A part of the stationary object among the other objects constitutes a landmark serving as an index of the position on the map, and the exterior environment recognition unit 14 also recognizes the position and type of the landmark.

The action plan generation unit 15 generates a driving path (target path) of the subject vehicle from a current point of time to a predetermined time ahead on the basis of, for example, the target route calculated by the navigation unit 6, the subject vehicle position recognized by the subject vehicle position recognition unit 13, and the external situation recognized by the exterior environment recognition unit 14. When there is a plurality of paths that are candidates for the target path on the target route, the action plan generation unit 15 selects, from among the plurality of paths, an optimal path that satisfies criteria such as compliance with laws and regulations and efficient and safe traveling, and sets the selected path as the target path. Then, the action plan generation unit 15 generates an action plan corresponding to the generated target path. The action plan generation unit 15 generates various action plans corresponding to travel modes, such as overtaking traveling for overtaking a preceding vehicle, lane change traveling for changing a travel lane, following traveling for following a preceding vehicle, lane keeping traveling for keeping the lane so as not to deviate from the travel lane, deceleration traveling, or acceleration traveling. When the action plan generation unit 15 generates the target path, the action plan generation unit 15 first determines a travel mode, and generates the target path on the basis of the travel mode.

In the self-drive mode, the driving control unit 16 controls each of the actuators AC such that the subject vehicle travels along the target path generated by the action plan generation unit 15. More specifically, the driving control unit 16 calculates a requested driving force for obtaining the target acceleration for each unit time calculated by the action plan generation unit 15 in consideration of travel resistance determined by a road gradient or the like in the self-drive mode. Then, for example, the actuator AC is feedback controlled so that an actual acceleration detected by the internal sensor group 2 becomes the target acceleration. That is, the actuator AC is controlled so that the subject vehicle travels at the target vehicle speed and the target acceleration. Note that, in the manual drive mode, the driving control unit 16 controls each of the actuators AC in accordance with a travel command (steering operation or the like) from the driver acquired by the internal sensor group 2.

The map generation unit 17 generates the environmental map constituted by three-dimensional point cloud data using detection values detected by the external sensor group 1 during traveling in the manual drive mode. Specifically, an edge indicating an outline of an object is extracted from a captured image acquired by a camera 1*a* on the basis of luminance and color information for each pixel, and a feature point is extracted using the edge information. The feature point is, for example, an intersection of the edges, and corresponds to a corner of a building, a corner of a road sign, or the like. The map generation unit 17 sequentially plots the extracted feature points on the environmental map, thereby generating the environmental map around the road on which the subject vehicle has traveled. The environmental map may be generated by extracting the feature point of an object around the subject vehicle using data acquired by radar or LiDAR instead of the camera. Further, when generating the environmental map, the map generation unit 17 determines whether or not a landmark such as a traffic light, a sign, or a building as a mark on the map is included in the captured image acquired by the camera by, for example, pattern matching processing. When it is determined that the landmark is included, the position and the type of the landmark on the environmental map are recognized on the basis of the captured image. The landmark information is included in the environmental map and stored in the memory unit 12.

The subject vehicle position recognition unit 13 performs subject vehicle position estimation processing in parallel with map creation processing by the map generation unit 17. That is, the position of the subject vehicle is estimated on the basis of a change in the position of the feature point over time. Further, the subject vehicle position recognition unit 13 estimates the subject vehicle position on the basis of a relative positional relationship with respect to a landmark around the subject vehicle. The map creation processing and the position estimation processing are simultaneously performed, for example, according to an algorithm of SLAM. The map generation unit 17 can generate the environmental map not only when the vehicle travels in the manual drive mode but also when the vehicle travels in the self-drive mode. If the environmental map has already been generated and stored in the memory unit 12, the map generation unit 17 may update the environmental map with a newly obtained feature point.

Incidentally, when recognizing (estimating) the subject vehicle position, the subject vehicle position recognition unit 13 first extracts a feature point from the captured image including the landmark within the angle of view acquired by the camera 1*a*. Then, the extracted feature points are collated (matched) with the environmental map (point cloud data) to recognize landmarks (feature points corresponding to the landmarks) on the environmental map. Next, the subject vehicle position recognition unit 13 calculates the distance between the subject vehicle and the landmark on the basis of the position of the landmark on the captured image, and estimates the position of the subject vehicle on the environmental map on the basis of the calculated distance and the positions of the landmarks on the environmental map. At this time, as the number of feature points constituting the environmental map is larger, the accuracy of matching is improved, and the subject vehicle position can be estimated more accurately. On the other hand, when the number of feature points constituting the environmental map increases, the data amount of the environmental map increases, and the capacity of the memory device is greatly reduced. Therefore, in the present embodiment, a map generation apparatus and a position recognition apparatus including the map generation apparatus are configured as described below so as to reduce the data amount of the environmental map while suppressing a decrease in accuracy of estimation of the subject vehicle position.

Figure 2:
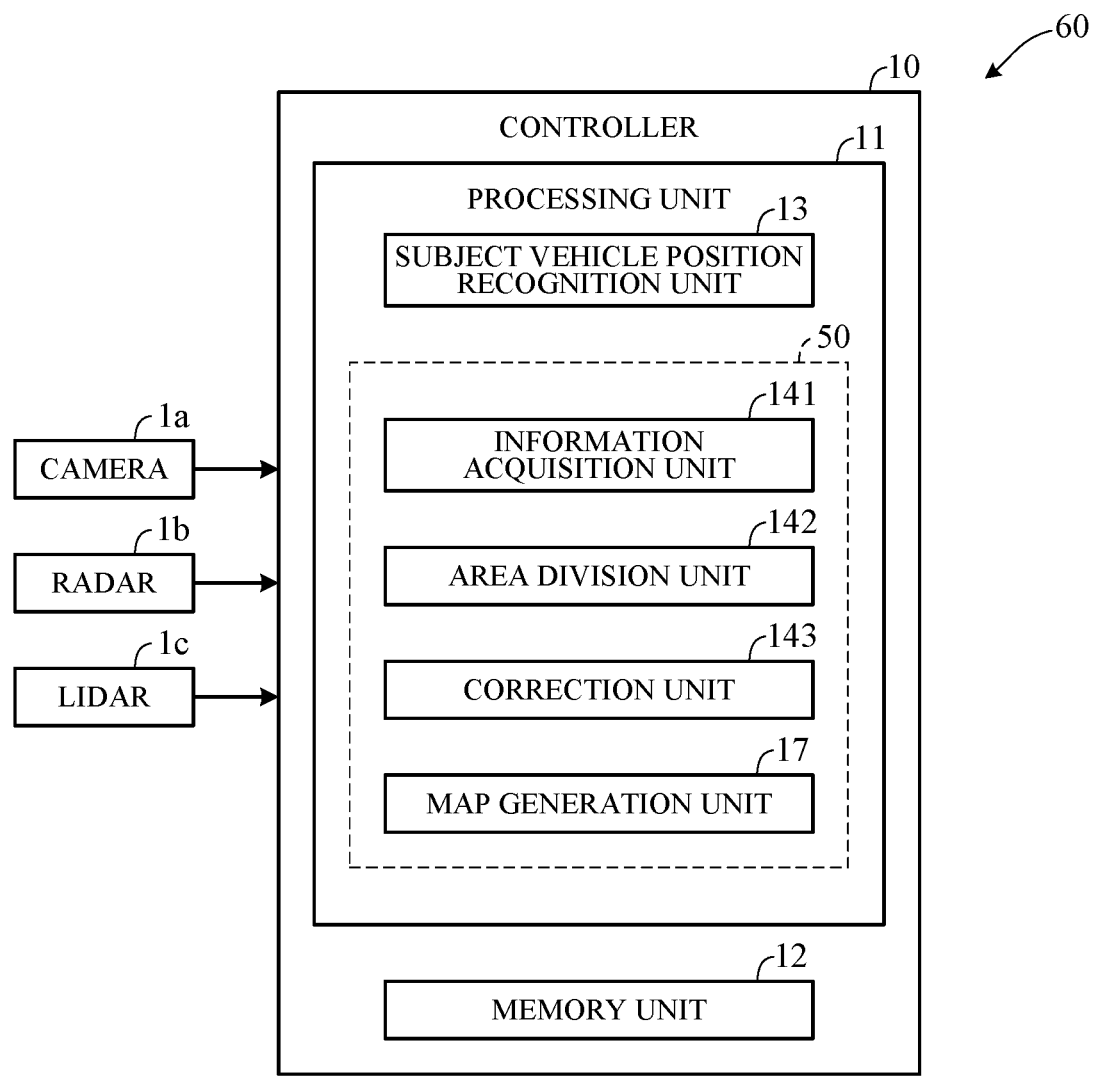
FIG. 2 is a block diagram illustrating a main configuration of a position recognition apparatus according to an embodiment of the present invention.

FIG. 2 is a block diagram illustrating a main configuration of a position recognition apparatus 60 according to the embodiment of the present invention. This position recognition apparatus 60 controls the traveling operation of the subject vehicle and constitutes a part of the vehicle control system 100 of FIG. 1. As illustrated in FIG. 2, the position recognition apparatus 60 includes the controller 10, the camera 1a, the radar 1b, the LiDAR 1c, and the actuator AC. Further, the position recognition apparatus 60 includes a map generation apparatus 50 constituting a part of the position recognition apparatus 60.

The camera 1a is a monocular camera having an imaging element (image sensor) such as a CCD or a CMOS, and constitutes a part of the external sensor group 1 in FIG. 1. The camera 1a may be a stereo camera. The camera 1a images the surroundings of the subject vehicle. The camera 1a is mounted at a predetermined position, for example, at the front of the subject vehicle, and continuously captures an image of a space in front of the subject vehicle to acquire an image data (hereinafter, referred to as captured image data or simply a captured image) of the object. The camera 1a outputs the captured image to the controller 10. The radar 1b is mounted on the subject vehicle and detects other vehicles, obstacles, and the like around the subject vehicle by emitting electromagnetic waves and detecting reflected waves. The radar 1b outputs a detection value (detection data) to the controller 10. The LiDAR 1c is mounted on the subject vehicle, and measures scattered light with respect to irradiation light in all directions of the subject vehicle and detects a distance from the subject vehicle to surrounding obstacles. The LiDAR 1c outputs a detection value (detection data) to the controller 10.

The controller 10 includes the subject vehicle position recognition unit 13, an information acquisition unit 141, an area division unit 142, a correction unit 143, and the map generation unit 17 as functional configurations of the processing unit 11 (FIG. 1). Note that the information acquisition unit 141, the area division unit 142, the correction unit 143, and the map generation unit 17 are included in the map generation apparatus 50. The information acquisition unit 141, the area division unit 142, and the correction unit 143 are constituted by, for example, the exterior environment recognition unit 14 in FIG. 1.

Figure 3:
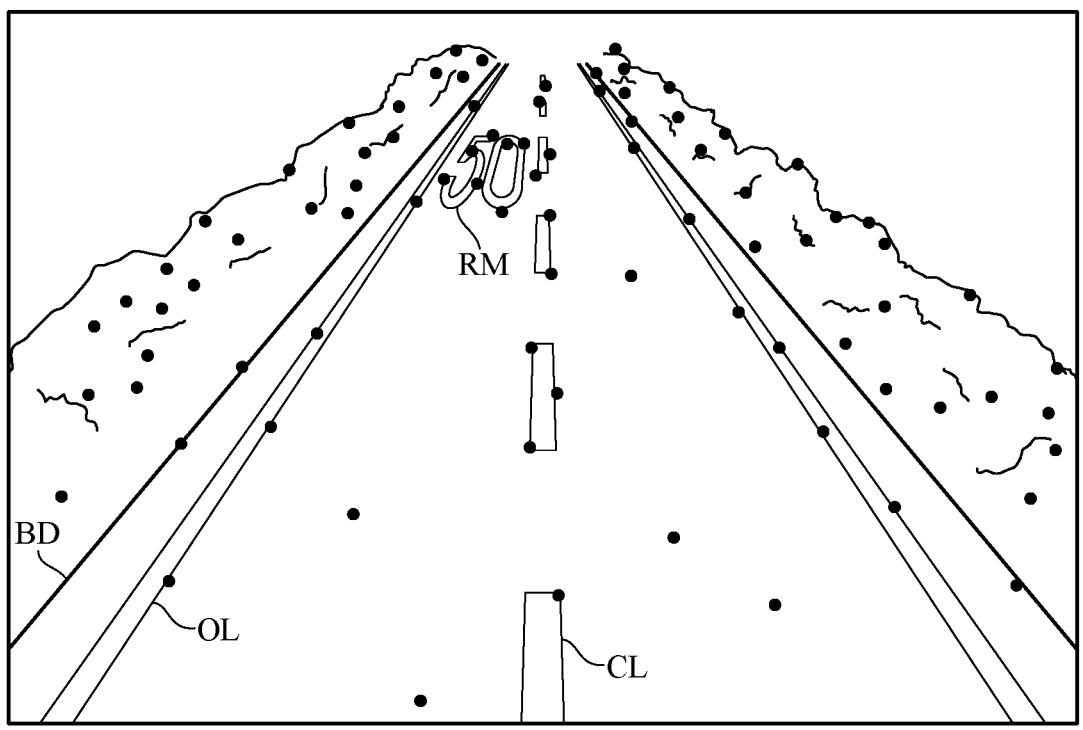
FIG. 3 is a diagram schematically illustrating a feature point group constituting an area of a part of an environmental map.

The information acquisition unit 141 acquires division line information regarding a division line of a road. In more detail, the information acquisition unit 141 reads landmark information included in the environmental map from the memory unit 12, and further acquires, from the landmark information, information (hereinafter, referred to as division line information) indicating the positions of division lines and boundary lines (boundary lines between the road and the curbstones) of the road on which the subject vehicle travels and the extension directions of the division lines and the boundary lines. Note that when the division line information does not include the information indicating the extension direction of the division lines and the boundary lines, the information acquisition unit 141 may calculate the extension direction of the division lines and the boundary lines on the basis of the position of the division lines and the boundary lines. Further, information indicating the positions and the extension direction of division lines and boundary lines of the road on which the subject vehicle travels may be acquired from road map information or a white line map (information indicating the positions of white lines such as a center line or edge lines) stored in the memory unit 12. FIG. 3 is a diagram in which a feature point group constituting an area of a part of the environmental map (a certain section on a left-hand traffic two-lane road) is schematically superimposed on a captured image of the area. Black circles in the drawing represent feature points. The area of FIG. 3 includes a road surface marking RM, a center line CL, an edge line OL, and a boundary line (a boundary line between a road and a curbstone or the like) BD.

Figure 4A:
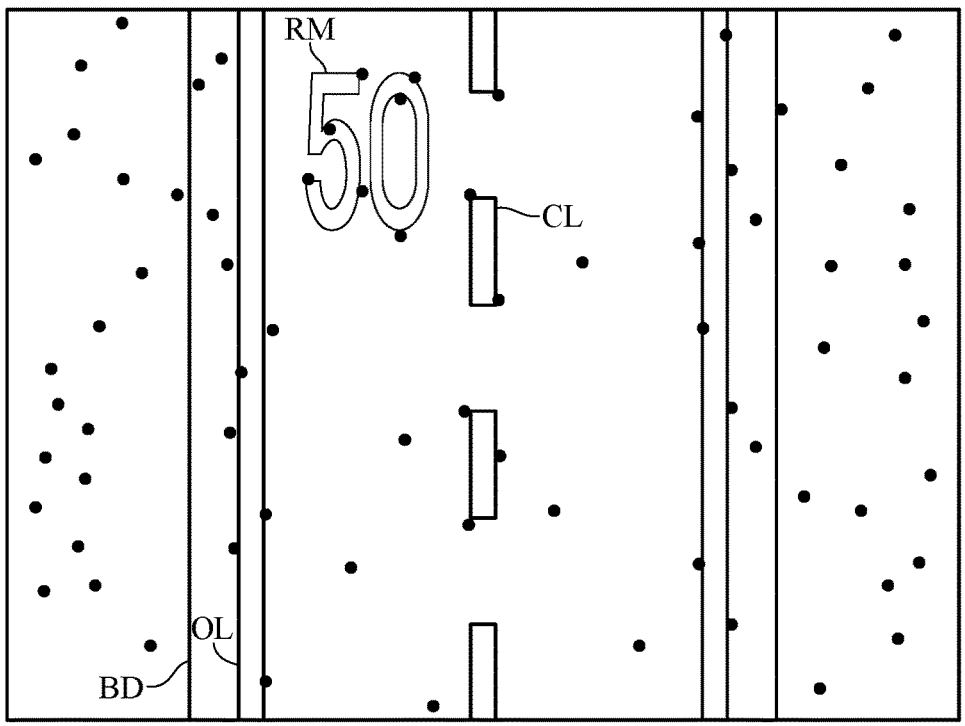
FIG. 4A is a diagram schematically illustrating the area of FIG. 3 in two dimensions.
Figure 4B:
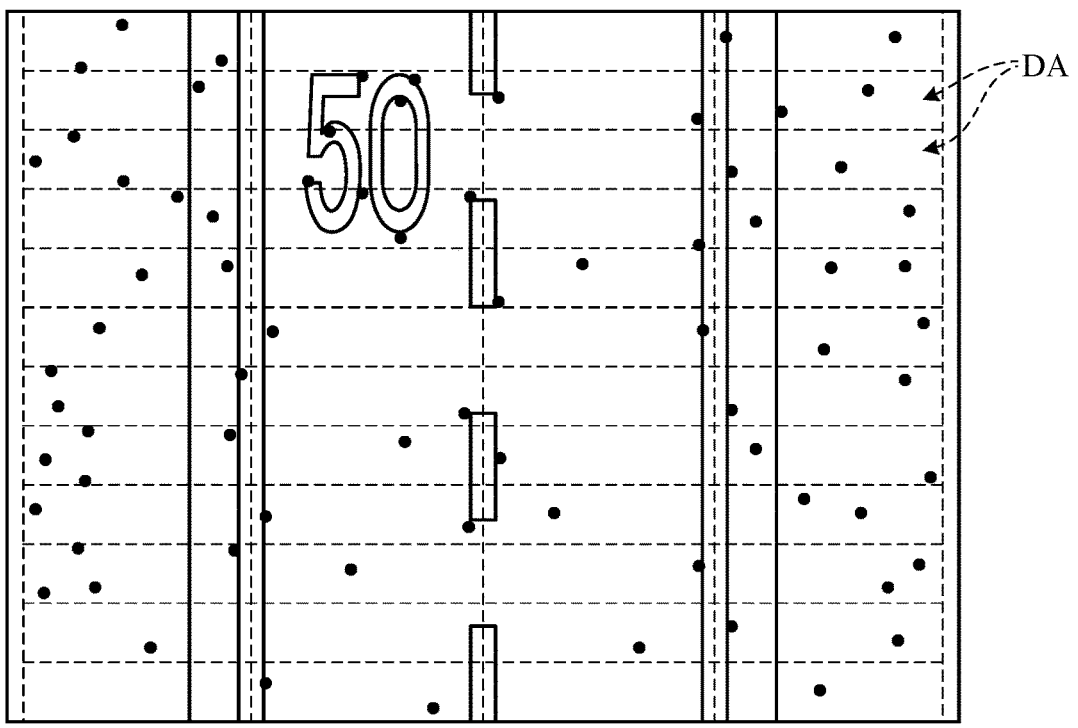
FIG. 4B is a diagram schematically illustrating divided areas formed by dividing the area of FIG. 3 in two dimensions.

The area division unit 142 divides the area on the environmental map in the traveling direction of the subject vehicle and divides the area in the vehicle width direction on the basis of the division line information acquired by the information acquisition unit 141 to form a plurality of divided areas. FIG. 4A is a diagram schematically illustrating the area of FIG. 3 in two dimensions. FIG. 4B is a diagram schematically illustrating divided areas formed by dividing the area of FIG. 3 in two dimensions. Note that the length of divided areas DA in the traveling direction (up-down direction in FIG. 4B) is set according to the accuracy required for estimation of the subject vehicle position, that is, the amount of positional deviation allowed for the result of estimation of the subject vehicle position. The length of the divided areas DA in the vehicle width direction (left-right direction in FIG. 4B) is preset on the basis of a result of an experiment or the like. Hereinafter, for the sake of simplification of description, a case where an area represented in two dimensions is divided will be described as an example, and for a three-dimensional area as illustrated in FIG. 3, it is sufficient if divided areas are formed by dividing the area in the traveling direction of the subject vehicle and in the vehicle width direction of the road in the same manner.

Figure 4C:
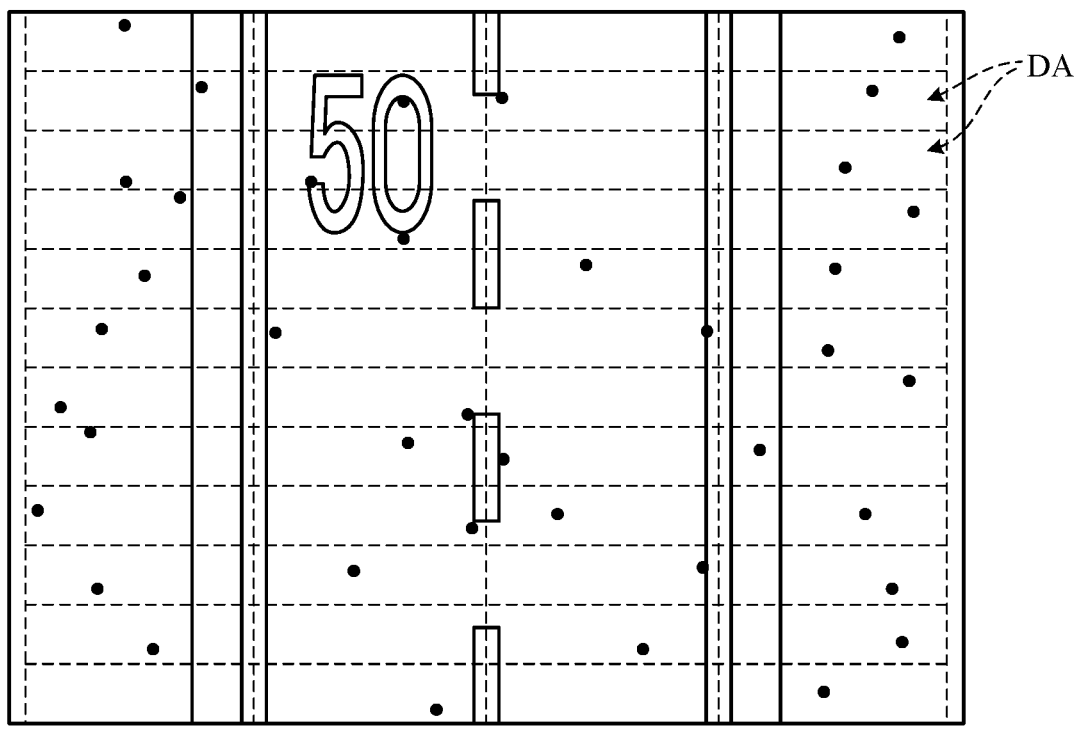
FIG. 4C is a diagram schematically illustrating divided areas in which the number of feature points has been corrected.

The correction unit 143 performs processing (hereinafter, referred to as feature point correction processing) of correcting the number of feature points constituting the environmental map for each divided area formed by the area division unit 142. Specifically, the correction unit 143 reduces the number of feature points in the divided areas on the basis of the distribution of feature points included in the divided areas. In more detail, the correction unit 143 calculates the centroid of the feature points on the basis of the distribution of the feature points in the divided areas, and reduces the number of feature points in the divided areas by thinning out feature points other than the feature points closest to the centroids. FIG. 4C is a diagram schematically illustrating divided areas subjected to the feature point correction processing. The feature points in the divided areas DA illustrated in FIG. 4C are the feature points closest to the centroids of the feature points included in the divided areas DA. Note that, although FIG. 4C illustrates an example in which all the feature points other than the feature points closest to the centroids are thinned out, some of the feature points other than the feature points closest to the centroids may be thinned out.

The subject vehicle position recognition unit 13 recognizes the position of the subject vehicle on the environmental map on the basis of the environmental map in which the number of feature points has been corrected by the correction unit 143. Specifically, first, the subject vehicle position recognition unit 13 estimates the position of the subject vehicle in the vehicle width direction. In detail, the subject vehicle position recognition unit 13 recognizes the division line and the boundary line of the road included in the captured image acquired by the camera 1a using machine learning (deep neural network (DNN) or the like). The subject vehicle position recognition unit 13 acquires the division line information from the landmark information included in the environmental map stored in the memory unit 12. The subject vehicle position recognition unit 13 recognizes the position and the extension direction of the division line and the boundary line included in the captured image on the environmental map on the basis of the division line information. Then, the subject vehicle position recognition unit 13 estimates a relative positional relationship (positional relationship on the environmental map) between the subject vehicle and the division line or the boundary line in the vehicle width direction on the basis of the position and the extension direction of the division line and the boundary line on the environmental map. In this manner, the position of the subject vehicle in the vehicle width direction is estimated.

Next, the subject vehicle position recognition unit 13 estimates the position of the subject vehicle in the traveling direction. In detail, the subject vehicle position recognition unit 13 extracts feature points from the captured image of the camera 1*a*. The subject vehicle position recognition unit 13 recognizes a landmark (for example, road surface marking RM in FIG. 3) from the captured image of the camera 1*a* by processing such as pattern matching, and recognizes a feature point corresponding to the landmark from among feature points extracted from the captured image. Further, the subject vehicle position recognition unit 13 calculates the distance between the subject vehicle and the landmark in the traveling direction on the basis of the position of the landmark on the captured image. Note that the distance between the subject vehicle and the landmark may be calculated on the basis of the detection value of the radar 1*b* or the LiDAR 1*c*. The subject vehicle position recognition unit 13 reads the environmental map from the memory unit 12, matches the feature point of the landmark recognized from the captured image with the environmental map, and recognizes the feature point corresponding to the landmark from among the feature points constituting the environmental map. Note that the environmental map read at this time is an environmental map in which the number of feature points has been corrected by the correction unit 143. The subject vehicle position recognition unit 13 estimates the position of the subject vehicle in the traveling direction on the environmental map on the basis of the position of the feature point corresponding to the landmark on the environmental map and the distance between the subject vehicle and the landmark in the traveling direction. On the basis of the position of the subject vehicle in the vehicle width direction and the traveling direction on the environmental map estimated in this manner, the subject vehicle position recognition unit 13 recognizes the position of the subject vehicle on the environmental map (corrected environmental map) in which the number of feature points has been corrected by the correction unit 143.

Figure 5:
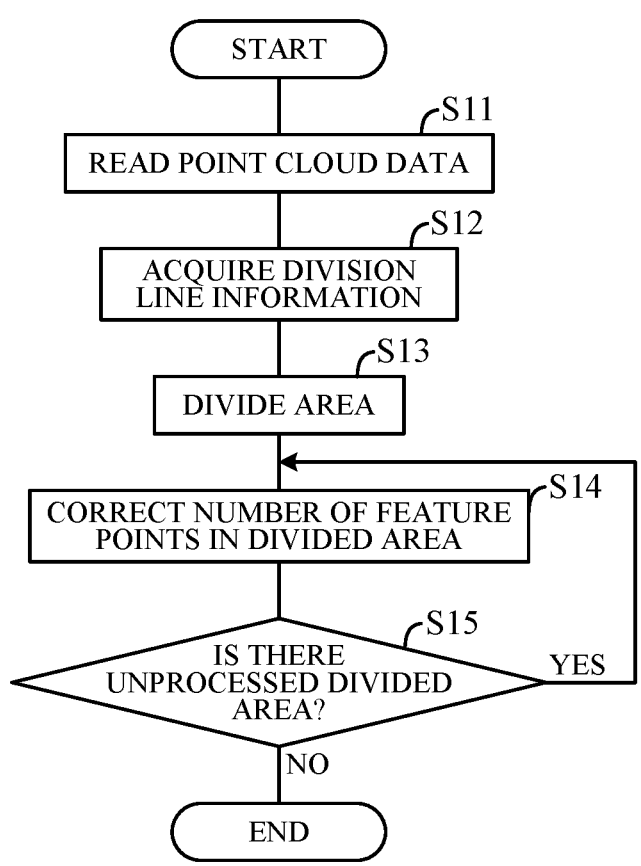
FIG. 5 is a flowchart illustrating an example of processing executed by the controller in FIG. 2.

FIG. 5 is a flowchart illustrating an example of processing executed by the controller 10 in FIG. 2 according to a predetermined program, particularly an example of processing regarding map generation. The processing illustrated in this flowchart is started, for example, during traveling in the manual drive mode, and is repeated at a predetermined cycle while traveling in the manual drive mode continues.

First, in S11 (S: processing step), a feature point group (point cloud data) corresponding to an area to be processed (hereinafter, referred to as a processing target area) is read from the environmental map stored in the memory unit 12. In S12, the landmark information is read from the environmental map stored in the memory unit 12, and further the division line information included in the landmark information is acquired. In S13, the processing target area is divided at predetermined intervals in the traveling direction of the subject vehicle and is divided at predetermined intervals in the vehicle width direction on the basis of the division line information acquired in S12 to form a plurality of divided areas. In S14, the number of feature points in one divided area among the divided areas is corrected. In detail, the centroid of the feature points is calculated on the basis of the distribution of the feature points in the divided area, and feature points other than the feature points closest to the centroids are thinned out. Thus, the number of feature points in the divided area is reduced. In S15, it is determined whether there is an unprocessed divided area. S15 is repeated until the determination is negative. If the determination is negative in S15, the processing ends.

FIG. 6 is a flowchart illustrating an example of processing executed by the controller 10 in FIG. 2 according to a predetermined program, particularly an example of processing regarding position estimation. The processing illustrated in this flowchart is started, for example, during traveling in the self-drive mode, and is repeated at a predetermined cycle while traveling in the self-drive mode continues.

First, in S21, it is determined whether a captured image has been acquired by the camera 1*a*. If the determination is negative in S21, the processing ends. When the determination is affirmative in S21, the division line and the boundary line of the road included in the captured image acquired in S21 are recognized using machine learning in S22. In S23, the landmark information is read from the environmental map stored in the memory unit 12, and further the division line information included in the landmark information is acquired. In S24, the position and the extension direction of the division line and the boundary line on the environmental map recognized in S22 are recognized on the basis of the division line information acquired in S23. Furthermore, a relative positional relationship (positional relationship on the environmental map) between the subject vehicle and the division line and the boundary line in the vehicle width direction is estimated on the basis of the position and the extension direction of the division line and the boundary line on the environmental map. Thus, the position of the subject vehicle in the vehicle width direction is estimated.

In S25, feature points are extracted from the captured image acquired in S21. In S26, on the basis of the captured image acquired in S21, the landmark is recognized by processing such as pattern matching, and the distance between the subject vehicle and the landmark is calculated. In S27, the environmental map (point cloud data) is read from the memory unit 12. The environmental map read at this time is an environmental map in which the number of feature points has been reduced by the processing illustrated in FIG. 5, that is, a corrected environmental map. In S28, the position of the subject vehicle in the traveling direction on the environmental map is estimated on the basis of the position of the feature point corresponding to the landmark on the environmental map and the distance calculated in S26. The position of the subject vehicle on the environmental map is estimated on the basis of the position of the subject vehicle in the vehicle width direction and the position in the traveling direction estimated as described above.

According to the embodiment of the present invention, the following operations and effects can be obtained:

(1) The map generation apparatus 50 includes the camera 1*a* that detects the situation around the subject vehicle, the subject vehicle position recognition unit 13 that extracts feature points from detection data (captured image) acquired by the camera 1*a*, the map generation unit 17 that generates a map using the feature points extracted by the subject vehicle position recognition unit 13, the area division unit 142 that divides an area on the map generated by the map generation unit 17 in the traveling direction of the subject vehicle and divides the area in the vehicle width direction on the basis of division line information regarding a division line of a road to form a plurality of divided areas, and the correction unit 143 that corrects the number of feature points extracted by the subject vehicle position recognition unit 13 for each of the divided areas formed by the area division unit 142. The correction unit 143 reduces the number of feature points on the basis of the distribution of feature points included in the divided areas. Thus, it is possible to reduce the data amount of the map information while suppressing a decrease in accuracy of the map information.

(2) The correction unit 143 calculates the centroids of the feature points on the basis of the distribution of the feature points in the divided areas and thins out feature points other than the feature points closest to the centroids for each of the divided areas. Thus, it is possible to suppress a decrease in accuracy of the map due to a reduction in feature points.

(3) The area division unit 142 divides the area on the map generated by the map generation unit 17 in the vehicle width direction on the basis of the division line information such that the divided areas are arranged along the division line. Thus, it is possible to further suppress a decrease in accuracy of the map due to a reduction in feature points.

(4) The position recognition apparatus 60 includes the map generation apparatus 50 and the subject vehicle position recognition unit 13 that estimates the position of the subject vehicle in the traveling direction on the basis of the map generated by the map generation apparatus 50 and in which the number of feature points has been reduced by the map generation apparatus 50, and estimates the position of the subject vehicle in the vehicle width direction on the basis of the detection data (captured image) acquired by the camera 1*a* and the division line information regarding the division line of the road. The area division unit 142 determines the length of the divided areas in the traveling direction on the basis of the accuracy required for estimating the position of the subject vehicle, and divides the area on the map generated by the map generation unit 17 on the basis of the determined length in the traveling direction. Thus, the position of the subject vehicle can be accurately recognized when the subject vehicle travels in the self-drive mode on the basis of the map in which the number of feature points has been reduced by the map generation apparatus 50.

The above-described embodiment can be modified into various forms. Hereinafter, some modifications will be described. In the embodiment described above, the camera 1*a* is configured to detect the situation around the subject vehicle, however, the configuration of an in-vehicle detection unit may be any configuration as long as the situation around the subject vehicle is detected. For example, the in-vehicle detection unit may be the radar 1*b* or the LiDAR 1*c*. Further, in the embodiment described above, the subject vehicle position recognition unit 13 extracts the feature points from the captured image acquired by the camera 1*a*, but the configuration of the feature point extraction unit is not limited thereto. Further, in the embodiment described above, the position of the subject vehicle in the traveling direction is estimated on the basis of the map in which the number of feature points has been reduced by the map generation apparatus 50, and the position of the subject vehicle in the vehicle width direction is estimated on the basis of the detection data (captured image) acquired by the camera 1*a* that detects the situation around the subject vehicle and the division line information regarding the division line of the road, but the configuration of the estimation unit is not limited thereto. Further, in the embodiment described above, the processing illustrated in FIG. 5 is executed while traveling in the manual drive mode, but the processing illustrated in FIG. 5 may be executed while traveling in the self-drive mode.

Further, in the embodiment described above, although the map generation apparatus 50 and the position recognition apparatus 60 are applied to the self-driving vehicle, the position recognition apparatus 60 is also applicable to vehicles other than the self-driving vehicle. For example, the map generation apparatus 50 and the position recognition apparatus 60 can also be applied to a manual driving vehicle including advanced driver-assistance systems (ADAS).

The present invention also can be configured as map generation method including: extracting one or more feature points from detection data acquired by an in-vehicle detection unit detecting a situation around a subject vehicle in traveling; generating a map using the feature points extracted in the extracting; dividing an area on the map generated in the generating in a traveling direction of a subject vehicle and dividing the area in a vehicle width direction based on a division line information regarding a division line of a road to form a plurality of divided areas; and correcting a number of feature points for each of the divided areas formed in the dividing, wherein the correcting including reducing the number of feature points based on a distribution of feature points included in each of the divided areas.

The above embodiment can be combined as desired with one or more of the above modifications. The modifications can also be combined with one another.

According to the present invention, it is possible to reduce the data amount of the map information while suppressing a decrease in accuracy of the map information.

Above, while the present invention has been described with reference to the preferred embodiments thereof, it will be understood, by those skilled in the art, that various changes and modifications may be made thereto without departing from the scope of the appended claims.

What is claimed is:

1. A map generation apparatus comprising:
an in-vehicle detection unit configured to detect a situation around a subject vehicle in traveling; and
a microprocessor and a memory connected to the microprocessor, wherein the microprocessor is configured to perform:
extracting one or more feature points from detection data acquired by the in-vehicle detection unit;
generating a map using the feature points;
dividing an area on the map in a traveling direction of the subject vehicle and dividing the area in a vehicle width direction based on division line information regarding a division line of a road to form a plurality of divided areas; and
correcting a number of feature points for each of the divided areas, wherein
the microprocessor is configured to perform
the dividing including dividing the area on the map in the vehicle width direction based on the division line information such that the divided areas are arranged along the division line, and
the correcting including calculating a centroid of the feature points in each of the divided areas based on a distribution of the feature points in each of the divided areas, and thinning out one or more feature points other than a feature point closest to the centroids for each of the divided areas to reduce the number of feature points.

2. The map generation apparatus according to claim 1, wherein
the microprocessor is configured to perform
the correcting including thinning out all feature points other than the feature point closest to the centroids for each of the divided areas.

3. A position recognition apparatus comprising:
an in-vehicle detection unit configured to detect a situation around a subject vehicle in traveling; and
a microprocessor and a memory connected to the microprocessor, wherein the microprocessor is configured to perform:
extracting one or more feature points from detection data acquired by the in-vehicle detection unit;
generating a map using the feature points;
dividing an area on the map in a traveling direction of the subject vehicle and dividing the area in a vehicle width direction based on division line information regarding a division line of a road to form a plurality of divided areas; and
correcting, for each of the divided areas, a number of feature points based on a distribution of feature points included in each of the divided areas, wherein
the microprocessor is configured to further perform
the dividing including dividing the area on the map in the vehicle width direction based on the division line information such that the divided areas are arranged along the division line,
the correcting including calculating a centroid of the feature points in each of the divided areas based on the distribution of the feature points in each of the divided areas, and thinning out one or more feature points other than a feature point closest to the centroids for each of the divided areas to reduce the number of feature points, and
estimating a position of the subject vehicle in the traveling direction based on the map in which the number of feature points has been reduced, and estimating a position of the subject vehicle in the vehicle width direction based on the detection data acquired by the in-vehicle detection unit and the division line information regarding the division line of the road.

4. The position recognition apparatus according to claim 3, wherein
the microprocessor is configured to perform
the dividing including determining a length of the divided areas in the traveling direction based on an accuracy required for estimating the position of the subject vehicle, and dividing the area on the map based on the length of the divided areas in the traveling direction.

5. A map generation method comprising:
extracting one or more feature points from detection data acquired by an in-vehicle detection unit detecting a situation around a subject vehicle in traveling;
generating a map using the feature points;
dividing an area on the map in a traveling direction of the subject vehicle and dividing the area in a vehicle width direction based on division line information regarding a division line of a road to form a plurality of divided areas; and
correcting a number of feature points for each of the divided areas, wherein
the dividing includes dividing the area on the map in the vehicle width direction based on the division line information such that the divided areas are arranged along the division line, and
the correcting includes calculating a centroid of the feature points in each of the divided areas based on a distribution of the feature points in each of the divided areas, and thinning out one or more feature points other than a feature point closest to the centroids for each of the divided areas to reduce the number of feature points.

6. The position recognition apparatus according to claim 3, wherein
the microprocessor is configured to perform
the correcting including thinning out all feature points other than the feature point closest to the centroids for each of the divided areas.

* * * * *